United States Patent [19]

Davidson

[11] Patent Number: 4,529,871
[45] Date of Patent: Jul. 16, 1985

[54] PRICE MARKING SYSTEM

[75] Inventor: Brian Y. Davidson, Toronto, Canada

[73] Assignee: Loblaw Companies Limited, Toronto, Canada

[21] Appl. No.: 427,103

[22] Filed: Sep. 29, 1982

[51] Int. Cl.³ .......................................... G06K 15/00
[52] U.S. Cl. .................................. 235/383; 235/385; 346/94
[58] Field of Search ................ 235/383, 385; 364/403, 364/464, 479; 346/94; 40/2 R

[56] References Cited

U.S. PATENT DOCUMENTS 4,028,537 6/1977 Snow .............................. 235/385 X
4,084,742 4/1978 Silverman .......................... 235/383

Primary Examiner—David L. Trafton
Attorney, Agent, or Firm—Rogers, Bereskin & Parr

[57] ABSTRACT

A price marking system for use with a product checkout system such as a supermarket checkout system. In the price marking system a label printer and label applicator are located in the checkout counter immediately downstream of the product scanner. When the checkout clerk passes the product unit over the scanner, causing the store computer to provide to the display screen and receipt tape printer signals indicative of the product description and price, this information is also fed to the label printer which prints for each product unit a label containing the product description, price and date of purchase. The product unit is then moved to the label applicator which applies the printed label to the product unit. Alternatively the information can be printed directly on the product unit.

3 Claims, 16 Drawing Figures

LOBLAWS STORE — 0563

| | |
|---|---|
| CHEESE SLICES | 3.08 |
| AYLMER TOMAT. | .95 |
| MILK 3 QT. BAG | 2.49 |
| TIDE DETERG. | 1.57 T |
| TAX DUE | .11 |
| TOTAL | 8.20 |
| CHQ. TEND | 10.00 |
| CHANGE DUE | 1.80 |

7/12/82 18=32
THAN YOU — CALL AGAIN

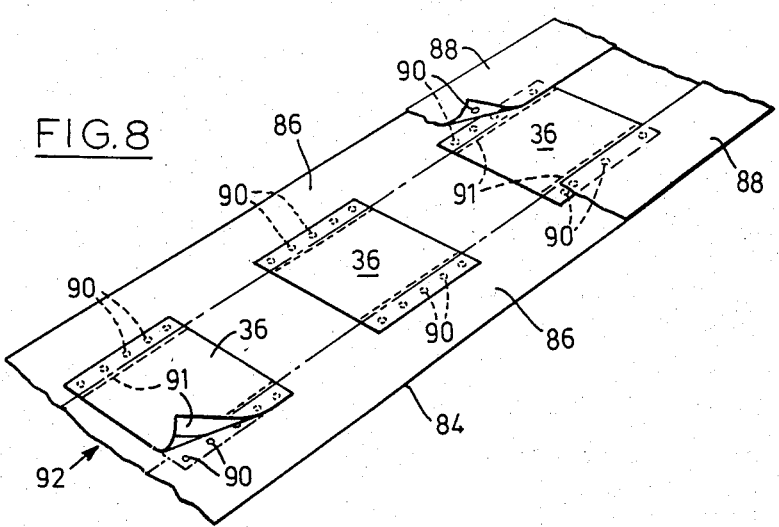
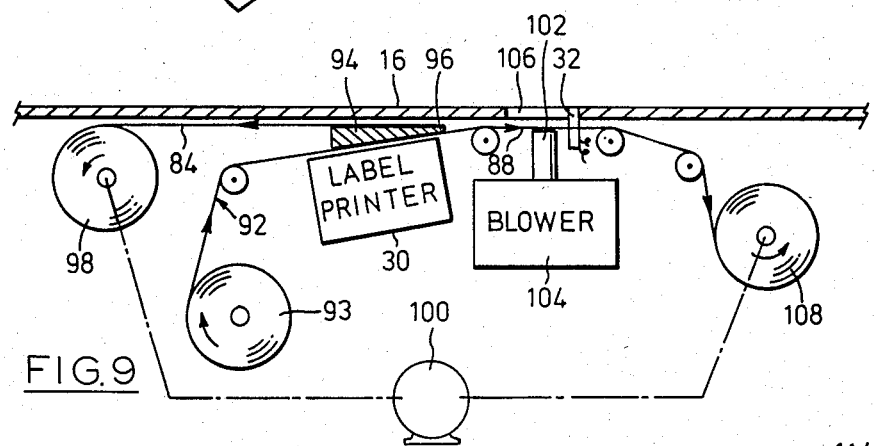
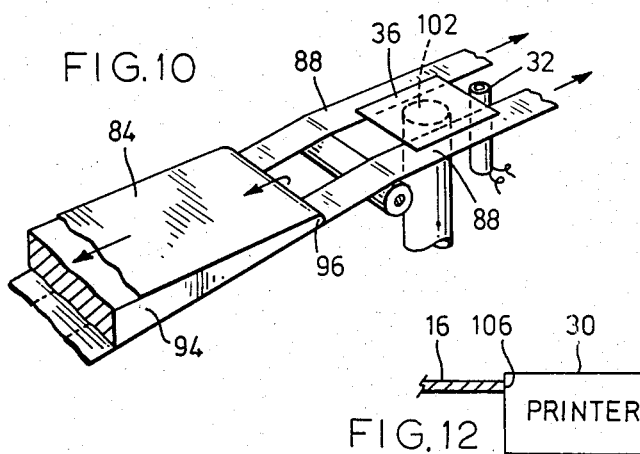
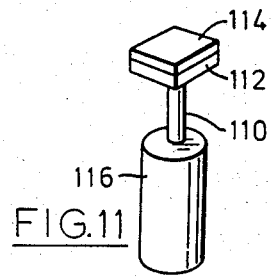
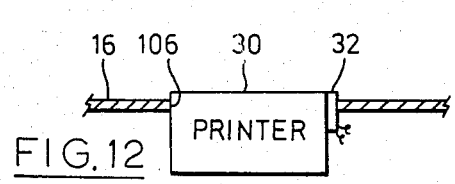

PRICE MARKING SYSTEM

This invention relates to a price marking system for use with product checkout systems such as those found in supermarkets. The invention will be described in connection with retail grocery supermarkets but may be used in other kinds of stores, such as department stores.

Products which are shipped to a retail grocery supermarket are normally received in cases and are stocked on store shelves for sale in individual units. Usually the label or packaging of each unit is marked with coded symbols, commonly in accordance with the universal product code (UPC) in North America. (Other industry codes may also be used.) Each set of symbols represents a unique number. When a product unit is picked up by a consumer and taken to a checkout counter, the cashier passes the unit over a scanner. The UPC or other code on the unit is read by the scanner, which is connected to a store computer. Using the identified number, the computer looks up the product in the computer memory and retrieves the product description and unit price assigned to the product in question. This information is then printed on a cash register receipt tape for the customer and is also displayed on a screen.

The use of the universal or similar product codes together with scanning systems was intended to eliminate the need to apply price labels to individual product units on the store shelves. Application of a price label to each product unit on a store shelf has proven extremely costly, not only because of the labour required, but also because the person marking the prices may use an out-of-date price list, may select the wrong item on the list, may transpose price numbers, or may simply set his pricing machine in error. The cost of such a manual price marking system has been estimated by some to be as much as between 1 and 1.5 percent of the gross revenues of a retail supermarket.

Unfortunately, although the universal product code and scanning systems have been available for approximately 14 years, both consumer resistance and government resistance have in most cases made it impossible to eliminate the use of individual price labels on each product unit on the shelves. Some consumer associations have caused local governments to legislate that each product unit be price marked before it leaves the store.

The invention provides a solution which will eliminate many of the objections associated with lack of price markings on individual product units located on store shelves, and will therefore facilitate the use of mechanized pricing systems without the need for individual price marking. According to the invention in its broadest aspect there is provided, for use with a product checkout system comprising automated means for scanning one at a time with coded labels on a series of products and generating a product signal therefrom, said automated means including receipt tape printer means responsive to said product signal for producing a price tape containing the price of each product scanned and a total for said prices, the improvement comprising price receiving means adapted to be connected to said automated means for receiving therefrom a marking signal indicative of the price of each said product, and marking means connected to said price receiving means for marking on each product the price thereof.

Further objects and advantages of the invention will appear from the following description, taken together with the accompanying drawings in which:

FIG. 8 is a perspective view of a label strip that may be used with the invention;

FIG. 9 is a diagrammatic view of the mechanical portion of a label printing and applicator system that may be used with the invention;

FIG. 10 is a view of a portion of the system shown in FIG. 9;

FIG. 11 is a view of a modification of the FIG. 10 system;

FIG. 12 is a diagrammatic view of a further modified system according to the invention;

Figure 1:
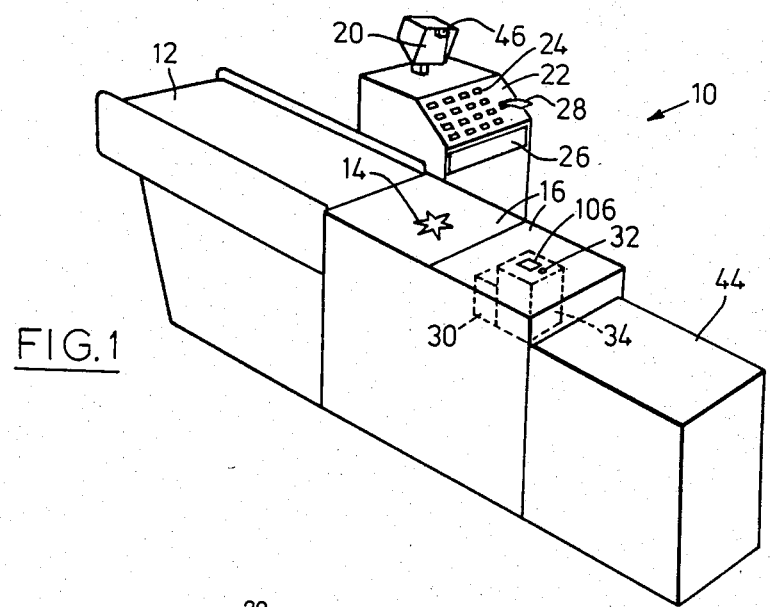
FIG. 1 is a diagrammatic view of a supermarket checkout system according to the invention.
Figure 2:
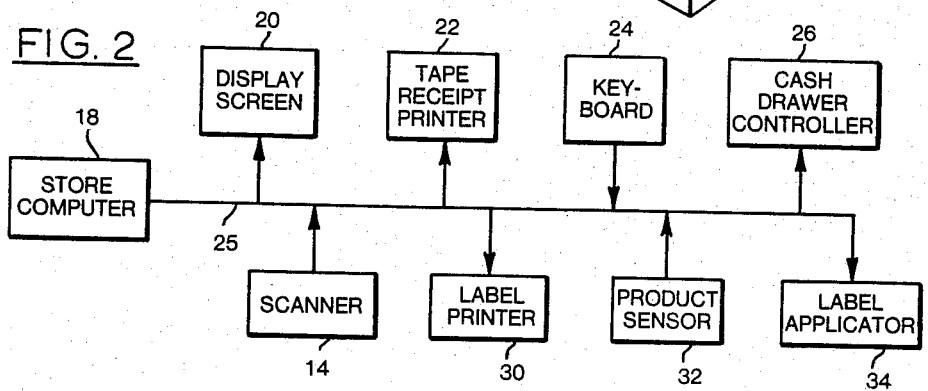
FIG. 2 is a block diagram showing the components of the system of FIG. 1.

Reference is first made to FIG. 1, which shows an exemplary supermarket checkout system 10 which incorporates the invention. As shown, the checkout system 10 includes a conveyor 12 on which groceries are deposited by the shopper. The conveyor 12 forms part of a checkout counter 16. The cashier picks up the products one unit at a time from the conveyor 12 and passes each unit over a scanner 14 located in the checkout counter 16. The scanner 14 reads the universal product code on the unit and sends a signal representative of the particular code to the store computer 18 (FIG. 2).

The computer 18 next looks up in its memory the product description and price assigned to the product in question. This information is then sent by the computer to a display screen 20 which displays the price so that it may be seen by the customer. The price and product description are also sent to a receipt tape printer 22 where a cash receipt tape is printed containing a list of all the products purchased and their prices, together with a total. The tape usually also contains an identification of the store, the date, a record of the cash offered by the customer, the change returned, credits due, and of any applicable taxes.

If the product unit in question does not have an appropriate product code marked on it, then the cashier punches in on keyboard 24 either the price or a price lookup code and a department code. This information is again sent to the store computer 18, which then sends a signal to the display screen 20 to cause this unit to display the price, and which also sends a signal to the receipt tape printer 22 so that the price and product category identification will be printed on the receipt tape. Bus lines 25 connect the various components.

Figure 3:
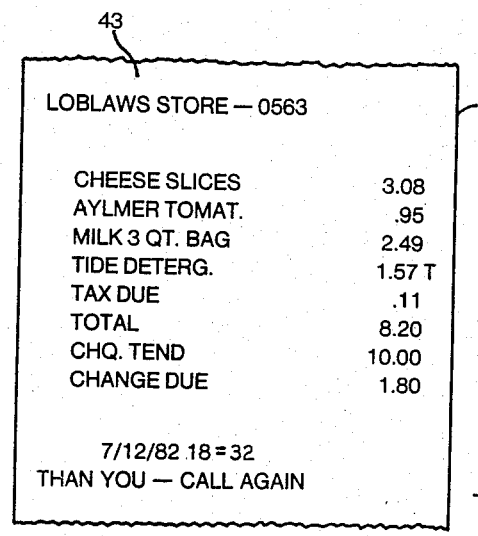
FIG. 3 is a view of a typical cash receipt tape produced by the system of FIGS. 1 and 2.

When a total price has been calculated and the cash submitted has been entered, the computer 18 sends a signal to a cash drawer controller 26 so that the cash drawer may be opened to receive the cash and so that change may be provided. A typical cash receipt tape produced by this arrangement, which as so far described is conventional, is shown at 28 in FIG. 3.

Figure 4:
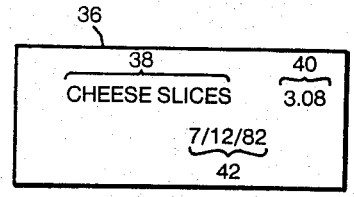
FIG. 4 is a view of a typical label produced according to the invention.

According to the invention in one of its aspects, a label printer 30, product sensor 32, and label applicator 34 are provided on the checkout counter 13. The label printer 30, product sensor 32, and label applicator 34 are located adjacent but downstream of the scanner 14. When the cashier passes a product unit over the scanner 14, causing the computer 18 to generate data indicative of the product description and price, this data is sent to the label printer 30 where it is used to print a label containing the product description and price, and normally also containing the date of the transaction. The apparatus used to obtain the information and to print the label will be described shortly. The label is printed virtually instantaneously, within a few milliseconds after the product unit has been scanned by the scanner 14. A typical label produced according to the invention is shown at 36 in FIG. 4 and as discussed includes a product description 38, a product price 40, and the date 42. The label 36 may also include a store identification such as a store name and number, which is often now printed on the cash receipt tape (as shown at 43 in FIG. 3). The label 36 has an adhesive backing so that it will adhere to a product unit.

After the cashier has passed the product unit being purchased over the scanner 14, he or she then next passes the unit over the product sensor 32 and the label applicator 34. The product sensor 32 senses the presence of the product unit and causes the label applicator 34 to apply the label 36 to the product unit. As will be described, the label applicator 34 can blow the label onto the product unit, or it can mechanically apply the label to the product unit, or in appropriate cases, the information in question can be printed directly onto the product unit without a label.

After the individual price, product description and date of purchase have been marked on each product unit, such product unit is moved to a bagging station 44 where the products purchased are assembled for bagging or removal by the customer.

The application of a label or price marking to each product unit just after it has been scanned, at the point of purchase, has a number of substahtial advantages, which include the following:

1. Customer satisfaction is increased since the customer can readily determine exactly what price has been paid for each article, not only at the point of sale but also later at home, should the customer wish to compare the price for this article with the price paid at a later time for similar articles.

2. Store security is improved since all products which have been through the proper checkout procedure are clearly marked with labels or price markings printed thereon. Any articles without such labels or price markings are known not to have been checked out and paid for. This reduces the likelihood of so-called "sweetheart" arrangements, in which a cashier fails to charge for an article "purchased" by an accomplice.

3. One of the major objections to the use of unpriced products on shelves, namely the inability of the customer to determine after purchase the price paid for the product unit, is eliminated so that the cost of manually price marking individual products units placed on shelves for sale can in most cases be eliminated, thus substantially reducing costs to the store and ultimately to the customer.

4. The accuracy of pricing to the customer is increased, since it is computer controlled and since there will be no discrepancy between manually applied price markings on each product unit and the computer determination of the price of the product unit.

When a number of identical product units have been purchased, the clerk may pass only one over the scanner 14 and may use the keyboard 24 to inform the store computer that more than one unit has been purchased. In that case only one label 36 will be printed and it will be applied to one of the identical product units. The others will be unlabelled but the labelled unit will normally satisfy customer information requirements.

Figure 5:
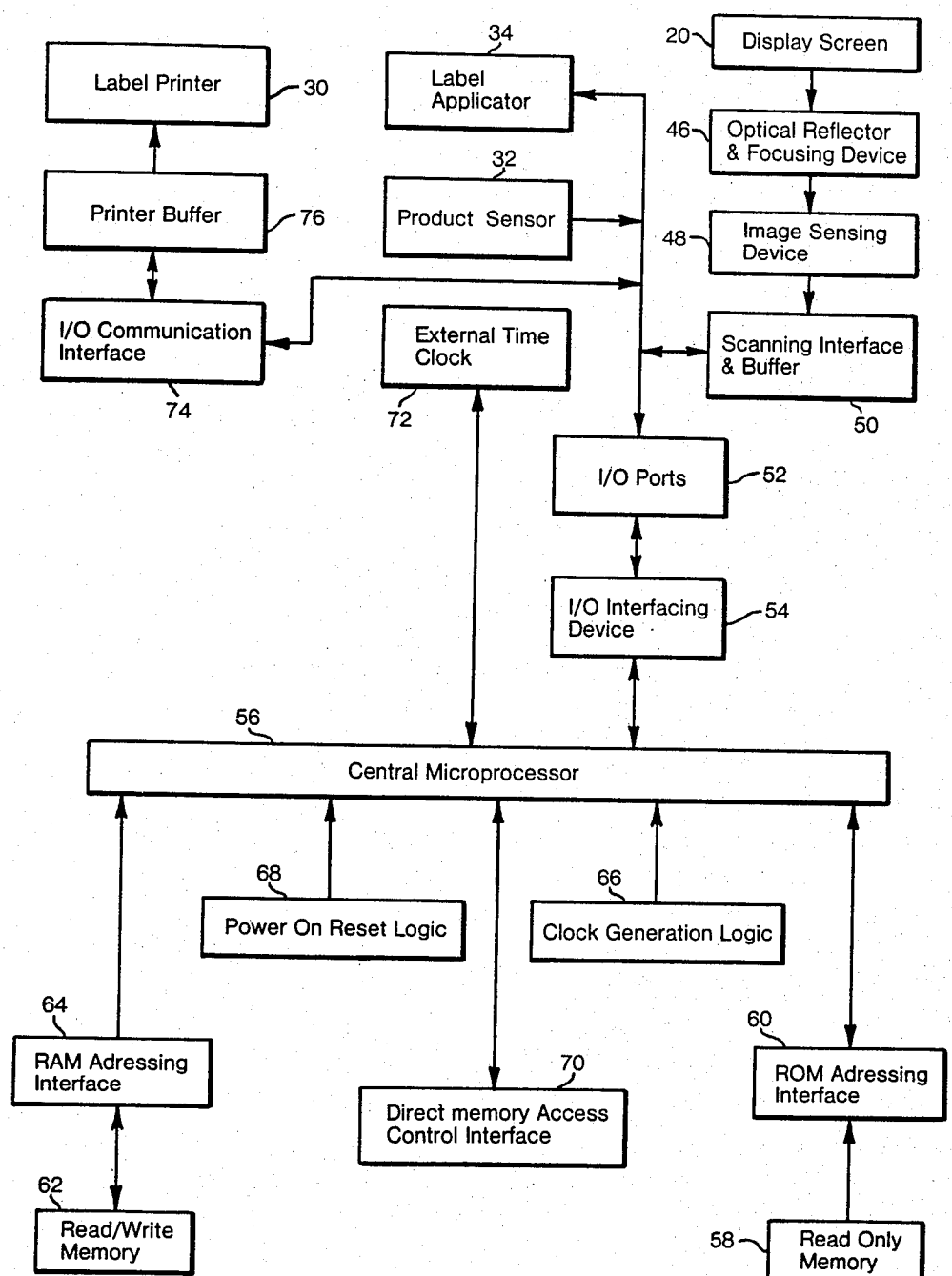
FIG. 5 is a block diagram of a label printing and applicator system according to the invention.

Reference is next made to FIG. 5, which is a block diagram of a typical system used to acquire and print the product description, price and date on each individual product unit. The FIG. 5 system is used when it is desired not to make any wiring connections to the store computer 18 (since such wiring connections may involve disturbance of the functions of the store computer and may also affect the manufacturer's warranty and agreement to service the store computer).

The system of FIG. 5 includes an optical reflector and focussing device 46 mounted adjacent the display screen 14 (as also shown in FIG. 1) to focus the display characters appearing on the display screen onto an image sensing device 48. The optical reflector and focussing device 46 may simply be a mirror or prism. The image sensing device 48 is conventionally available as a simple integrated circuit chip.

The image sensing device 46 is connected through a scanning interface and buffer 50, and through input/output ports 52 and an input/output interfacing device 54, to a central microprocessor 56. Also connected to the central microprocessor 56 are a read only memory (ROM) 58 which is connected through a ROM addressing interface 60 to the central microprocessor, a random access read/write memory (RAM) 62 connected through a RAM addressing interface 64 to the central microprocessor, a clock generation logic circuit 66, a power on reset logic circuit 68, and a direct memory access control interface 70 (which contains the system program). An external time clock 72 is also connected to the central microprocessor 56 to supply the information needed to print the date of the transaction.

The input/output ports 52 are also connected through an input/output communication interface 74 to a printer buffer 76 which in turn is connected to the label printer 30. The input/output ports 52 are further connected to the product sensor 32 and to the label applicator 34.

The operation of the system described in FIG. 5 is as follows. Firstly the external time clock 72 is set for the date. Once this clock has been set, it need not be reset unless the power is turned off. The clock 72 can be conventionally equipped with a battery so that the date is retained therein.

Next, the scanning interface and buffer 50 is scanned by the central microprocessor 56 until the store computer 18 has caused a complete set of characters to be displayed on the display screen 14. The scanning method used is typically as follows. As characters are being formed (normally in a series of dots) on the display screen 20 and detected at the scanning interface and buffer 50, they are scanned at predetermined intervals by the central processor 56. On the first scan in which partially formed characters are detected, the data received from the scan is placed in a first memory location in RAM 62. On the next scan the data from the scan is placed in a second location in RAM 62 and the data in the two memory locations is compared. If there is a difference in the data in the two memory locations, this indicates that the characters on the display screen 20 are still being generated and the scanning by the central processor 56 continues. When there is no longer any difference between the data in the two memory locations, this indicates that the characters on the display screen 20 are the final characters representing the price and product description for the product unit which has just been scanned by scanner 14.

The final characters displayed on the display screen 20 and now stored in the RAM 62 are next compared with the set of characters stored in the ROM 58. The ROM 58 contains a table listing the information which is not to be printed on the individual label 36. For example, items such as introductory information, totals, tax information, change and the like are not to be printed on the label 36.

If the set of characters in the RAM 62 from the image sensing device 48 corresponds with the information in the ROM 58, then the central microprocessor 56 disregards these characters and resumes scanning the scanning interface and buffer 50 for a new set of characters. If on the other hand there is no correspondence between the final characters from the image sensing device 48 and the information in the ROM 58, then the central microprocessor 56 transmits information representative of the final characters in the RAM 62 to the printer buffer 76. The microprocessor 56 then activates the label printer 30 which prints a label 36 with the final characters in the RAM 62, together with the contents of the external time clock 72 (namely the date, month and year). Thus, the label 36 has now been printed with the product description 38, price 40, and date 42. (Alternatively the ROM 58 can contain a table of all data to be printed on the label, and then printing will occur only when the data in the RAM 62 corresponds with that in the ROM 58.)

Next, when the presence of the product unit is detected by the product sensor 32, the central processor 56 activates the label applicator 34, which then applies the label 36 to the product unit. The system is then ready for the next product unit.

Figure 6:
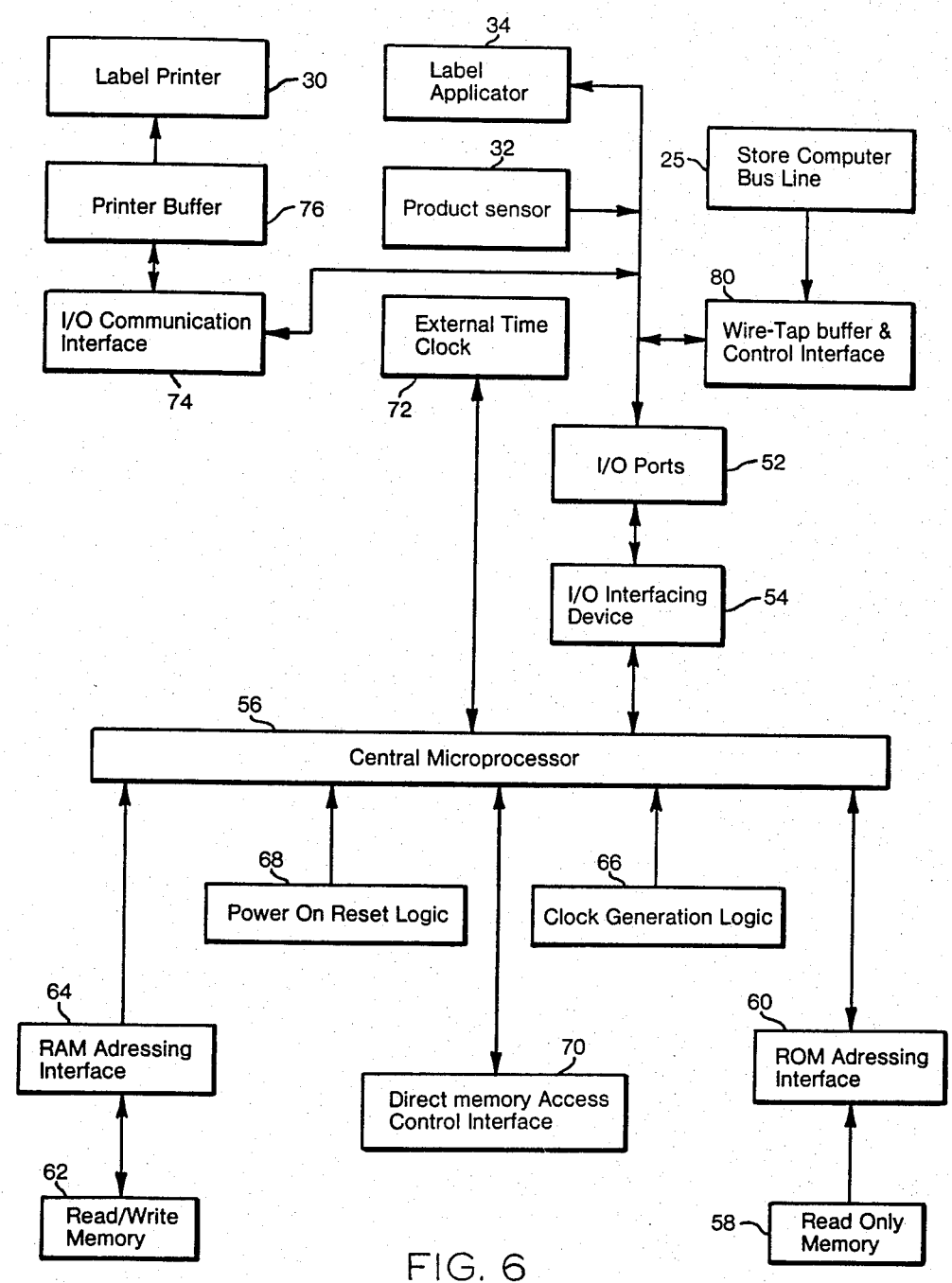
FIG. 6 is a block diagram of a modified label printing and applicator system according to the invention.

In some cases it may be possible to make connections directly to the store computer. A system for this purpose is shown in FIG. 6, where corresponding reference numerals indicate parts corresponding to those of FIG. 5. The FIG. 6 system is the same as that shown in FIG. 5, except that the optical reflector and focussing device 46 and the image sensing device 48 have been eliminated, and the scanning interface and buffer 50 have been replaced by a wire tap buffer and control interface 80. The buffer and control interface 80 is a high impedance buffer connected directly to the bus lines 25 which extend between the store computer 18 and its output devices such as the receipt tape printer 22 and display screen 20. The current drawn by the buffer and control interface 80 is negligible in relation to that drawn by the display screen 20 and receipt tape printer 22 so that the buffer and control interface 80 will in most cases have no effect on the operation of the computer 18. The remainder of the operation of the FIG. 6 device is exactly the same as that described in connection with FIG. 5.

Figure 7:
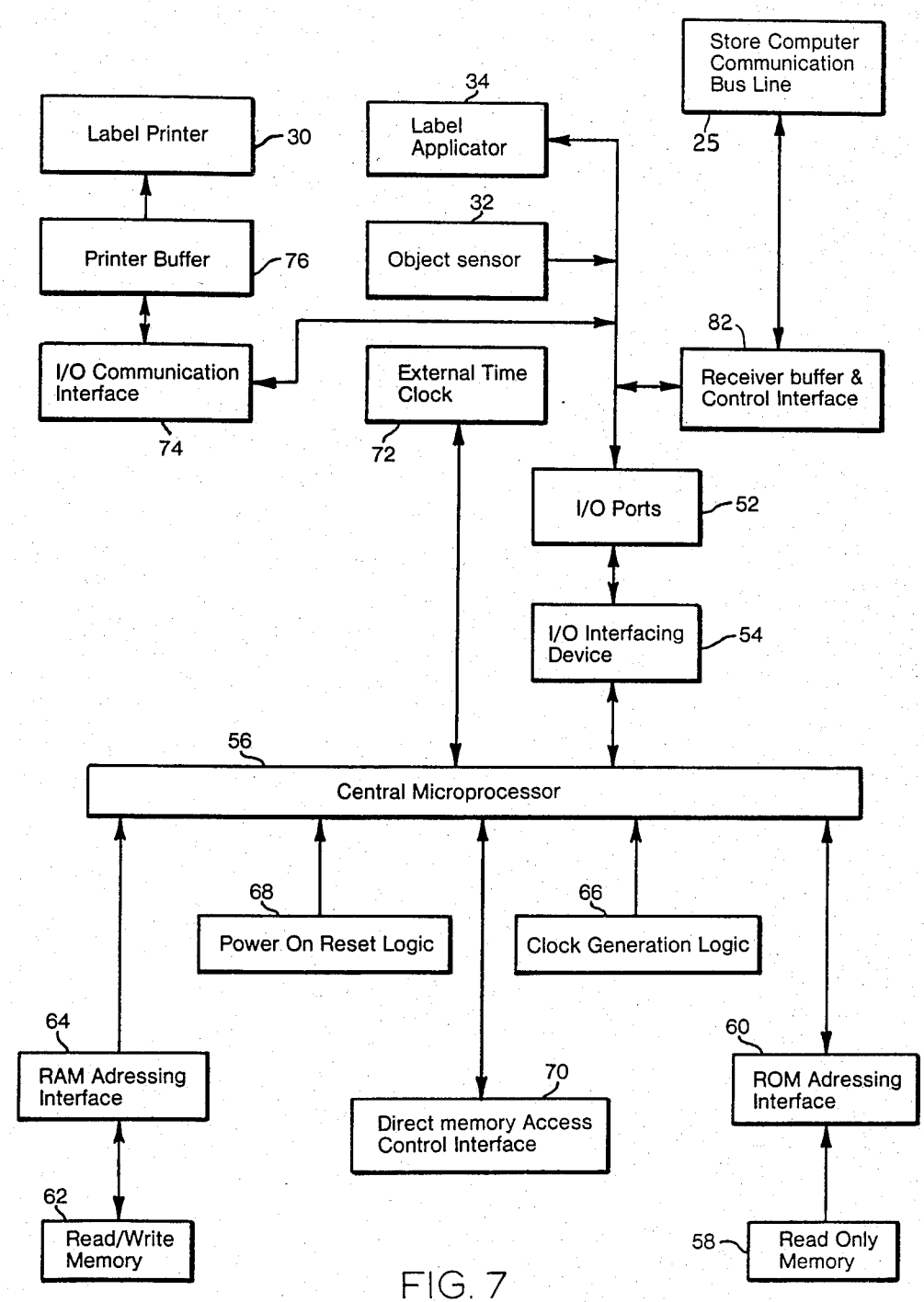
FIG. 7 is a block diagram of a still further modified label printing and applicator system according to the present invention.

In some cases, it may be desired to build the system of the invention directly into the store computer 18. In that event, the system shown in FIG. 7 may be used, in which corresponding reference numerals indicate parts corresponding with those of FIG. 5. The system shown in FIG. 7 is the same as that shown in FIG. 6, except that instead of a high impedance wire tap buffer and control interface 80, a conventional receiver buffer and control interface 82 is used, which need not be high impedance. The remainder of the elements shown in FIG. 7, except for the product sensor 32, the label printer 30, and the label applicator 34, may now be incorporated directly into the store computer. The printer buffer 76 will normally not be made part of the store computer.

Reference is next made to FIGS. 8 to 10, which show diagrammatically an exemplary arrangement which may be used for applying labels to the items purchased. In FIG. 8 the labels 36 are shown as located, end to end and spaced from each other, adhesive side down, on a silicone release coated backing strip 84. The strip 84 is wider than the labels 36 and extends beyond their edges to form strip margins 86. Two narrow front strips 88 are provided, one covering each strip margin 86 and overlapping the front surfaces of the labels 36 at their sides. The front strips 88 are lightly adhesively tacked, by dots 90 of adhesive, to the strip margins 86 and to the front surfaces of the labels 36 at the sides thereof. The front surfaces of the labels 36 at their sides have a silicone release coating 91 for easy release of the adhesive dots 90.

The composite label strip 92, consisting of the labels 36 and strips 84, 88, is supplied in a roll 93, FIG. 9, and is fed from roll 93 over a plate 94. Each label 36, when it passes over plate 94, is printed by label printer 30, which may be any suitable commercially available label printer.

The backing strip 84 then is guided around the relatively sharp front edge 96 of plate 94 and is wound up on a takeup roll 98 driven by a motor 100. The labels 36 are unable to turn around the sharp edge 96 and continue on, supported by the front strips 88, over the nozzle 102 of a blower 104. The nozzle 102 is located below an opening 106 in the checkout counter 16, so that a jet of air from nozzle 102 can blow a label 36 positioned thereover, through the opening 106 into a product unit located over the opening. The product sensor 32, which can be any conventional object sensor, is located beside the opening 106 as shown in FIG. 10. The front strips 88, after the label has been removed therefrom, are taken up on a takeup roll 108 which is also driven by the motor 100.

In operation, when a product unit is scanned by the scanner 14, the printer 30 prints the required information on a label positioned thereunder, as previously described. The printer 30 may be a thermal, laser or other known printer. As soon as the printing has been completed, within a few milliseconds of the scan, the motor 100 is operated by an instruction received from the central microprocessor 56, to move the printed label 36 on its supporting front strips 88 to a position under opening 106 and over nozzle 102, as shown in FIG. 10. This movement also moves another label 36 to a position under printer 30, ready to be printed. Then, when the product sensor 32 detects the presence of a product unit to be labelled and feeds a detection signal to the microprocessor 56, the microprocessor 56 signals the blower 104, which produces a short powerful diverging blast of air through the nozzle 102, blowing the printed label 36 onto the product unit to be labelled. The process is then repeated with the next label.

Air jet label applicators are presently available on the market. For example, such an applicator, used for producing labels for machines that weigh meat, wrap it and apply a label are presently available from Weldotron Corporation of New Jersey, U.S.A., under that company's designation "Weigh Wrap UPC System 5000".

If desired, instead of using a jet label applicator, a mechanical applicator may be used as shown in FIG. 11. FIG. 11 shows diagrammatically an applicator arm 110 having an end plate 112 tipped with a resilient material 114. The arm 110 is operated by a solenoid 116 and is positioned in place of the nozzle 102 beneath the opening 106 in the checkout counter 16. The arm 110, when it is operated by the solenoid 116, moves upwardly between the front strips 88 to apply the printed label 36 to the product unit positioned on the checkout counter 16 over the opening 106.

Figure 13:
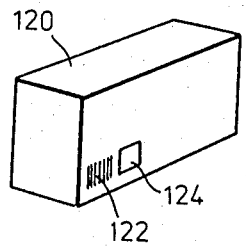
FIG. 13 is a perspective view of a product unit having an area to be printed.

In appropriate cases, where the product units to be marked can be printed on directly, the labels can be eliminated and the product description, price and date can be printed directly on the product unit itself. This situation is shown diagrammatically in FIG. 12, which shows the printer 30 located in and projecting slightly from the opening 106 in the checkout counter 16, so that the printer will print directly on a product unit which is placed thereon and detected by the product sensor 32. A laser printer is particularly appropriate for this purpose. Since the product unit 120 is already labelled with a product code, as indicated at 122 in FIG. 13, a location 124 beside the product code 122 may be provided, formed of photo-sensitive material, to receive the laser printing.

If desired, the label printer 30, label applicator 34 and product sensor 32 can be located remote from the scanner 14. However it is much preferred that these units be located in the checkout counter close to the scanner 14, so that the checkout clerk, after passing the product unit over scanner 14, can in a continuation of the movement of the product unit over the scanner 14, pass the product unit over the label applicator 34 and product sensor 32. Since only a short continuation of the movement of the product unit is then needed, very little additional time is required for the labelling, thus minimizing the need for extra checkout personnel.

Figure 14:
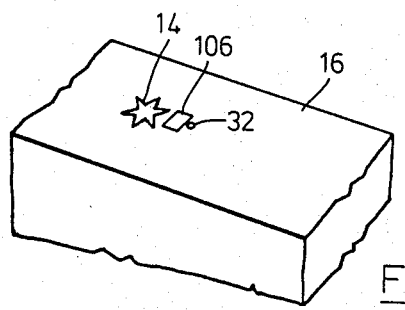
FIG. 14 is a perspective view of a portion of a modified checkout counter according to the invention.

If desired, the label printer and label applicator may be located as close to the scanner 14 as possible, as shown in FIG. 14, so that when the product unit is scanned, it will automatically be in position either for label application or to be directly printed upon. This minimizes any additional movement needed by the cashier for label application or printing. In addition, if the product surface to be printed is beside the product code and the product code is facing downwardly over the scanner, then the product surface to be printed can be located to face downwardly over the printer if the printer is immediately next to the scanner. Thus in one short motion the product unit is both scanned and printed (or labelled).

Figure 15:
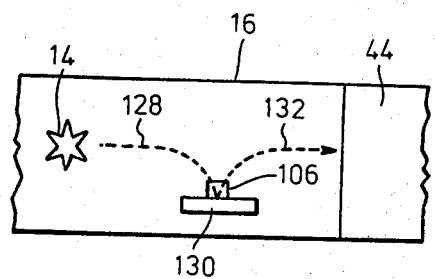
FIG. 15 is a top view of a further modified checkout counter according to the invention.

Alternatively, if positive location of the product unit is preferred for label application or printing, a stop such as that shown diagrammatically at 126 in FIG. 15 may be provided. The product unit after being scanned is moved along the path indicated by arrow 128 up against the stop 130 (which can be a post). A pressure sensitive sensor (not shown) in the stop 130 senses the contact of the product unit and signals the central processor 56 to actuate the label applicator 32 (or direct printer 30) provided that a product unit has been previously scanned. The product unit is then moved on as indicated by arrow 132 to the bagging station. Here a relatively short, but two step, motion of the product unit is required. The label applicator or direct printer may be located in the post or directly in front of it.

Figure 16:
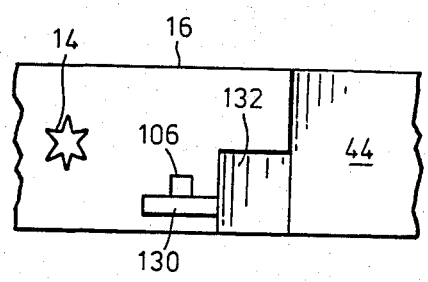
FIG. 16 is a top view of a still further modified checkout counter according to the invention.

If desired, and as shown in FIG. 16, the stop 130 may be located at the head of a chute 132 so that after being labelled, the product unit may travel directly down the chute 132 to the bagging station 44.

Although a label applicator has been shown which blows or otherwise moves the label into the product unit, a label applicator can be used of the kind which presents the label, sticky side up, on a roller or other surface so that the cashier can press the product unit onto the label, thus applying the label.

If desired, the price only can be printed on each product unit or on a label applied to each product unit. However, it is much preferred that the product description and date also be applied.

I claim:

1. For use with a product checkout system comprising automated means for scanning one at a time the coded labels on a series of products and generating a product signal therefrom, said automated means including receipt tape printer means responsive to said product signal for producing a price tape containing the price of each product scanned and a total for said prices, the improvement comprising price receiving means adapted to be connected to said automated means for receiving therefrom a marking signal indicative of the price of each said product, and marking means connected to said price receiving means for marking on each product the price thereof, said product signal containing unwanted data which is not to be marked by said marking means, said price receiving means including memory means containing an identification of said unwanted data, comparison means for comparing the data received from said product signal with said identification in said memory means, and processing means for causing said marking means to mark only when the data received from said product signal is not said unwanted data.

2. For use with a product checkout system comprising automated means for scanning one at a time the coded labels on a series of products and generating a product signal therefrom, said automated means including receipt tape printer means responsive to said product signal for producing a price tape containing the price of each product scanned and a total for said prices, the improvement comprising price receiving means adapted to be connected to said automated means for receiving therefrom a marking signal indicative of the price of each said product, and marking means connected to said price receiving means for marking on each product the price thereof, said product signal containing unwanted data which is not to be marked by said marking means, said price receiving means including memory means containing an identification of data which is to be marked by said marking means, comparison means for comparing the data received from said product signal with said identification in said memory means, and processing means for causing said marking means to mark only when the data received from said product signal corresponds to said identification in said memory means.

3. For use with a product checkout system comprising automated means for scanning one at a time the coded labels on a series of products and generating a product signal therefrom, said product signal including an identification of each said product, said automated means including receipt tape printer means responsive to said product signal for producing a price tape containing the price of each product scanned and a total for said prices, the improvement comprising price receiving means adapted to be connected to said automated means for receiving therefrom a marking signal which is indicative of the price of each said product, and which signal includes an identification of each said product, said price receiving means including means identifying the date of purchase of each said product, and marking means connected to said price receiving means and including printing means, for printing said price, product identification and data of purchase on a label, and applicator means for applying said label to said product, said applicator means comprising pneumatic means for blowing said label onto a product.

* * * * *